June 25, 1968  C. W. ASCHE  3,389,639
DUAL-MODE TRANSFER VALVE

Filed April 20, 1966  2 Sheets-Sheet 1

*INVENTOR.*
CLARENCE W. ASCHE
BY Roy M. Pitts

ATTORNEY

June 25, 1968  C. W. ASCHE  3,389,639
DUAL-MODE TRANSFER VALVE

Filed April 20, 1966  2 Sheets-Sheet 2

INVENTOR.
CLARENCE W. ASCHE
BY *Roy M. Pitts*

ATTORNEY

United States Patent Office 3,389,639
Patented June 25, 1968

3,389,639
DUAL-MODE TRANSFER VALVE
Clarence W. Asche, Placentia, Calif., assignor to North American Rockwell Corporation, a corporation of Delaware
Filed Apr. 20, 1966, Ser. No. 544,021
12 Claims. (Cl. 91—33)

ABSTRACT OF THE DISCLOSURE

Monostable fluid transfer valve means for providing automatically metered fluid flow to a load during a stable unactuated state thereof and for providing manual metering of fluid flow to a load during an unstable actuated state of the valve. In the unactuated state of the valve means, preloaded slidable lands provide a fluid communication path between an input and an output for the automatically metered fluid, and the lands also provide a stabilizing force acting to maintain a valve spool in a stable state. In the actuated state, the stabilizing force is removed and the valve spool becomes subject to manual control.

BACKGROUND OF THE INVENTION (1) *Field of the invention*

The present invention relates generally to dual-mode hydraulic valves and more particularly to a fluid transfer valve for selectively switching the operation of a single electro-hydraulic servo actuator between an electrical control mode and a mechanical control mode.

(2) *Description of the prior art*

Modern flight control systems are designed to control an aircraft in either a power-assisted manual operational mode or in an automatic mode at the discretion of the pilot. Heretofore, it has been standard practice to provide two separate actuators in the control system to accomplish the functions of automatic and manual control.

In the piror art, for example, a parallel actuator is used to position the pilot's control stick in response to inputs from an automatic flight control system in an aircraft, as an alternative to manual operation of the control stick by the pilot. A power boost actuator is further provided, in such prior art arrangement, to assist the pilot in manual operation in order to minimize the actuation load presented to the pilot. However, problems do exist in such a dual-actuator arrangement which lessen the general efficiency and utility thereof. Inherent in such prior art configuration are the problems of excess weight and higher cost along with reduced reliability and decreased efficiency due to the use of two separate actuators and other associated components. A solution to such problems is obtained through utilization of the dual-mode transfer valve of the present invention, which, in cooperation with a single actuator, provides a parallel actuating function during automatic control mode operation and a power boost actuating function during manual control mode operation.

In a preferred embodiment of the present invention there is provided a monostable fluid transfer valve which comprises a valve spool housing means having first and second input porting means adapted to be connected to a respective first and second source of fluid, output porting means, and preloaded, hydro-mechanically actuated valve spool means for providing fluid communication between the first input porting means and the output porting means only during an unactuated state of the valve spool means. Such valve spool means is further arranged for mechanically metering fluid flow between the output porting means and the second input porting means only during a hydro-mechanically actuated state of the valve spool means.

By means of the above recited arrangement, the complex, excessively heavy, double actuator system of the prior art is replaced by a single actuator system operable in the dual modes of automatic and manual control and providing the functions of parallel and power boost actuation. The resulting advantages include the reduction of components and therefor of cost and weight, the integration of separate functions by means of a single actuator arrangement, and an increase in reliability of operation due to the less complex nature of the design of the present invention. Accordingly, it is an object of the subject invention to provide an improved dual-mode hydraulic control valve.

It is another object of the invention to provide a dual-mode transfer valve for conveniently combining alternative automatic and manual control modes in an hydraulic control system.

It is still another object of the invention to provide a monostable control valve allowing fluid communication between a first pressurized fluid-source and a load in the stable state, and providing means for mechanically metering fluid flow between such load and a pressurized fluid source in a second or excited state.

It is yet another object of the invention to provide a fluid transfer valve for selectively providing, alternatively, fluid communication between either a remotely metered source of pressurized fluid and a load and means for mehcanically metering a source of pressurized fluid to such load.

It is a further object of the invention to provide a monostable fluid transfer valve having a preloaded, normally-unactuated valve spool for providing fluid transfer during automatic control mode operation thereof, and for providing fluid transfer during manual control mode operation upon actuation of the valve spool.

It is still a further object of the invention to provide a fluid transfer valve having automatic and manual operating modes in cooperation with a single fluid-controlled actuator.

A still further object of the present invention is to provide a control system employing a dual-mode fluid transfer valve in cooperation with a single hydraulic actuator and having both a manual mode and an automatic mode of operation.

Other objects and features of the invention will become apparent from the following detailed description when read in connection with the accompanying drawings of which:

Figure 1:
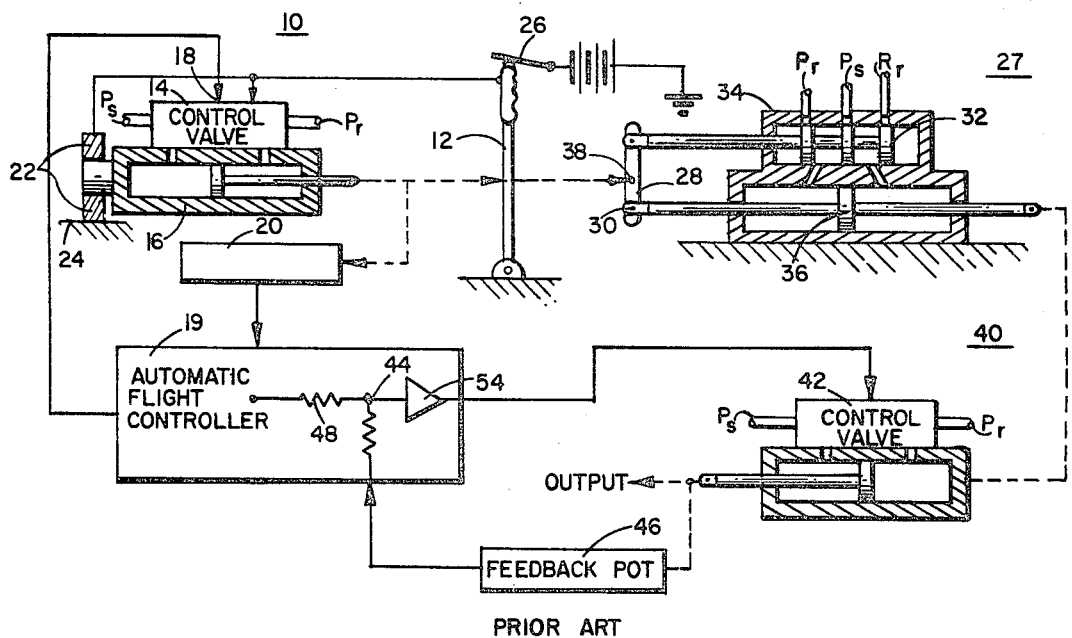
FIGURE 1 is a schematic diagram of an arrangement of a combined automatic and manual mode flight control system as practiced in the prior art.

Referring now to FIGURE 1, there is shown a schematic arrangement of a prior art combined automatic and manual mode flight control system. A review of such device may enable a fuller appreciation of the improvements obtained through the present invention.

In such prior art arrangement, there is provided a parallel servo 10 comprising an automatic control valve 14, hydraulic actuator 16, and a position feedback means 20 in closed loop cooperation for providing control during an automatic mode of operation. A pilot's stick 12 is mechanically coupled or linked with the parallel servo 10 as to be directly responsive to the controlling movements thereof. Automatic control valve 14 ports fluid pressure to the appropriate side of actuator 16 in response to navigational trajectory command reference signals applied at an electrical input terminal 18 by an automatic flight controller 19. During an automatic control mode operation of the arrangement of FIGURE 1, the parallel servo 10 is supported by a back-up platform, which may be provided by a locking clutch 22 attached to the airframe 24 (shown in the energized or locked position of FIGURE 1).

A stick switch 26 is provided for switching the parallel servo 10 off and for de-energizing the clutch member 22, thereby removing the backup platform for parallel servo 10. In such de-energized or disengaged state of clutch 22, the pilot stick 12 may be manually moved for manual control of the illustrated flight control system.

Because of the high inertia and friction provided by the parallel servo and the control linkages, a power boost servo 27 is necessary to provide for aiding the pilot in manually operating the extensive linkage connected to the pilot stick 12. Manual displacement of the pilot stick 12 causes a three bar connecting rod 28 to pivot about point 30 and thereby displace valve spool 32 resulting in fluid pressure being ported through manual control valve 34 to the appropriate side of piston 36. As piston 36 moves in response to the ported fluid, rod 28 then pivots about point 38 until the valve spool 32 is again recentered and the flow of pressurized fluid ceases. In other words, the arrangement of connecting rod 28 provides mechanical feedback for the power boost servo 27, as is well understood in the prior art.

The aircraft control input provided by parallel servo 10 and pilot stick 12 in conjunction with the power boost servo 27, is often referred to as outer-loop control. The general trajectory and attitude of the craft is determined by means of the outer-loop control devices. A complementary means of control is called inner-loop control, and pertains to the short period stabilization of the aircraft. As is understood in the control art, such stabilization is required in order to safely apply the outer-loop control signals, and is achieved by means of a series servo 40, which provides an extensible link or variable length portion of the linkage connecting the power boost servo 27 to the control surfaces of the vehicle, and by means of an input impedance 48 of series servo 40, being connected in circuit to a source of short period stability control input signals from the automatic flight controller 19 which controls automatic valve 42. Such input signals are combined at circuit junction 44 with a negative position feedback signal provided by a feedback potentiometer 46. The combined signals are amplified by valve drive amplifier 54 which provides closed loop control of the extensible link represented by series servo 40.

Accordingly, the prior art has employed a plurality of actuators for providing in combination a parallel, or alternative, command control function, a power boost function, and a series, or concomitant, vehicle stabilization control function. Limited attempts have been made in the prior art to integrate some of such actuator requirements in a single actuator-housing by combining the power boost function and the series servo function in a single-housing arrangement.

Figure 2:
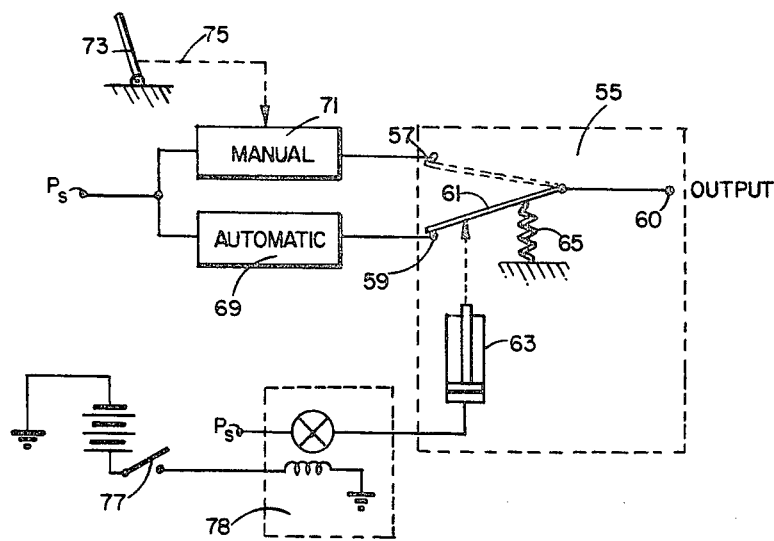
FIGURE 2 is a diagram of a system embodying one aspect of the inventive concept.

For example, the combination of a power boost servo and a series servo, is taught in U.S. Patent 2,733,878 issued on Feb. 7, 1956, to B. H. Ciscel. FIG. 2 thereof shows an integral structure which provides manual outer-loop control and concomitant automatic inner-loop control of an aircraft. However, there is no reduction in the complexity and number of structural elements required. Further, such device of Ciscel does not provide integration of the parallel servo and power boost servo functions of FIGURE 1 in a single integrated actuator.

With the foregoing picture of the prior art in mind, it may now be appreciated that an object of the present invention is to provide a significant advnace in the art by combining parallel servo 10 and power boost servo 27 of FIGURE 1 into a single integrated apparatus, necessitating the use of but one actuator. By means of the concept of the subject invention, the parallel servo 10, excluding the automatic control valve 14, with the accompanying locking clutch 22 is effectively eliminated, as shown more particularly in FIGURE 2.

Referring now to FIGURE 2, there is illustrated a schematic diagram of a system which embodies one aspect of the inventive concept. There is provided a monostable dual-mode transfer valve 55 comprising input ports 57 and 59 and output port 60, preloaded, two-position valve spool 61 in cooperation with preloading means 65 represented by an attached spring (for urging spool 61 into the monostable, preload position shown in FIGURE 2), and hydraulic switching means 63 for switching spool 61 into a second position. There is also provided automatic fluid-metering means 69 and manual fluid-metering means 71, which represent the respective sources of fluid input to ports 59 and 57 respectively. A fluid pressure source $P_s$ provides fluid input to both of valve means 69 and 71. A pilot stick 73 is shown connected by way of mechanical linkage 75 for actuation of manual valve means 71.

Hydraulically actuated switching means 63 is activated by means of a two-state, or on-off type valve 78 for alternatively applying and removing a source of hydraulic pressure $P_s$. Valve 78 may be comprised of an electrically actuated transfer valve operated by means of a switch 77, which switch may for convenience be mounted upon control stick 73.

In normal operation, the transfer valve 55 functions in one of two modes. In an unactuated state of mode switching means 63, the preloading or biasing means 65 maintains the preloaded valve spool 61 in the illustrated monostable position, providing fluid communication between input port 59 and output port 60. Upon actuation of hydraulic actuating means 63, valve spool means 61 is shifted to provide communication between input port 57 and output port 60, remaining in such mode of operation only so long as an actuating pressure continues to be applied to switching means 63. The two modes of operation function in parallel, or alternative, fashion; that is, one mode operates to the mutual exclusion of the other.

Figure 3:
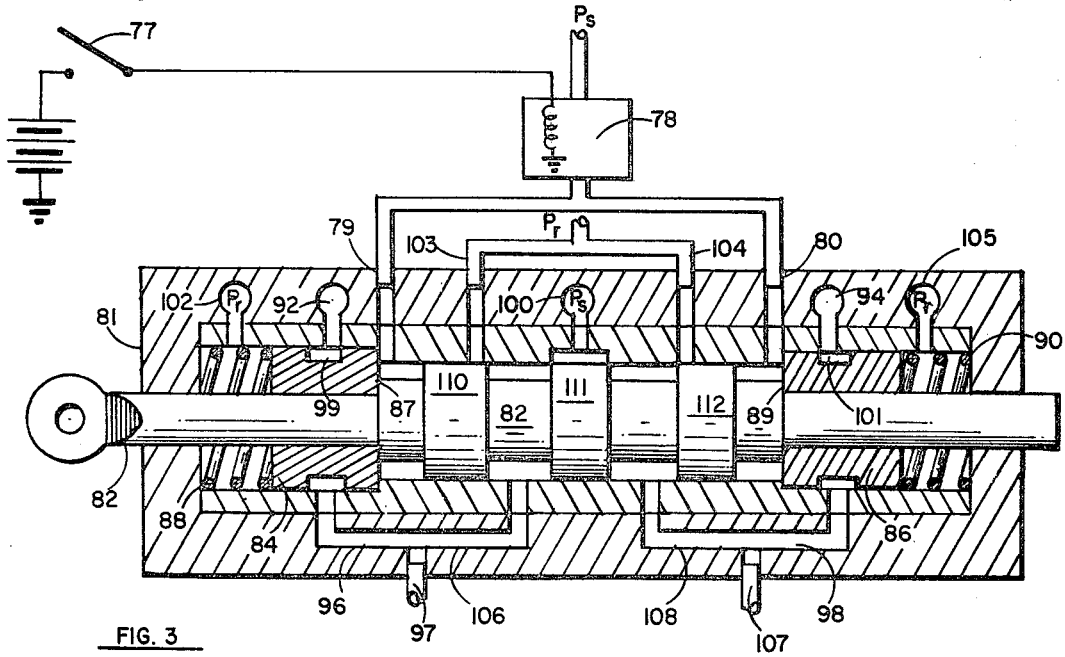
FIGURE 3 is a schematic representation of a preferred embodiment of another aspect of the invention.

A preferred embodiment of a dual mode valve which integrates two such alternative control functions for selective control of a single actuator, is shown in FIGURE 3.

Referring to FIGURE 3, there is illustrated a preferred embodiment of another aspect of the transfer valve of the present invention. There is provided a housing 81 within which is situated a four-way valve spool 82 having fixed lands 110, 111 and 112 thereon. First and second axially spring-loaded valve spool lands 84 and 86 are slidably mounted on opposite ends of valve spool 82. First and second springs 88 and 90 are interposed between either end of housing 81 and a respective one of slidable valve lands 84 and 86 to urge such land against a respective one of a pair of raised shoulders 87 and 89 situated intermediate an axial extremity of valve spool 82 and an end one of fixed lands 110 and 112.

In this way, valve spool 82 is held in a centered position as shown in FIGURE 3, with no fluid flow resulting between supply pressure input port 100 and either of output ports 97 and 107. Nor will fluid flow occur between output ports 97 and 107 and pressure return lines 103 and 104. Also, in such monostable or restrained position of lands 84 and 86, an annular groove in each of lands 84 and 86 provides fluid communication between an associated input and output port of a set of input ports 92 and 94, and a set of output ports 97 and 107. For example, groove 99 provides fluid communication between ports 92 and 97 via fluid line 96, and groove 101 provides fluid communication between ports 94 and 107 via fluid line 98.

Input ports 92 and 94 are adapted to receive metered fluid from a four-way valve, and cooperate with a respective one of ports 97 and 107 for control of a dual-flow hydraulic actuator (not shown). No fluid communication is possible between either supply pressure port 100 or return port $P_r$ and the output ports 97 and 107 due to the illustrated position of lands 110, 111 and 112 which respectively block fluid line 103, port 100 and fluid line 104. Hence, with valve spool 82 so restrained in the centered position, output ports 97 and 107 communicate only with an associated one of input ports 92 and 94 by means of a respective one of annular grooves 99 and 101.

There is also provided an hydraulic switching valve 78 which, when actuated by switch 77, provides fluid pressure to input ports 79 and 80 for the purpose of overcoming the preload condition of slidable lands 84 and 86, and axially displacing them from the illustrated monostable state, as to compress an associated one of springs 88 and 90. A pair of pressure return ports 102 and 105 are provided to facilitate the axial displacement of lands 84 and 86 by allowing any excess fluid to escape from the two ends of the valve chamber within housing 81. Upon and during actuation of the movable lands 84 and 86 from the respective monostable positions thereof, the respective annular grooves 99 and 101 no longer provide fluid communication between ports 92 and 97 and between ports 94 and 107. Also, such axial displacement of lands 84 and 86 frees valve spool 82 from axial restraint whereby such valve spool may cooperate with housing 81, in the conventional manner of a four-way valve, in connecting one of output ports 97 and 107 to pressure port 100, and the other to pressure return port $P_r$.

It may now be seen that the dual-mode transfer valve comprises a mechanically actuated four-way valve, having a valve spool 82 enclosed within a housing 81, which has been modified by adding thereto a pair of axially-preloaded, hydraulically-actuated, mutually-opposed lands 84 and 86 having annular grooves 99 and 101 thereon providing fluid paths during one operational mode, each land being slidably mounted upon valve spool 82 near an opposite extremity thereof for blocking axial motion of valve spool 82 relative to the housing 81 during an unactuated state of the lands 84 and 86. A switchable source of fluid pressure may be supplied for applying an axial force against the slidable lands 84 and 86 in opposition to the axial preloaded condition thereof for overcoming the same and thereby allowing mechanical actuation of the valve spool 82 relative to the housing 81.

Figure 4:
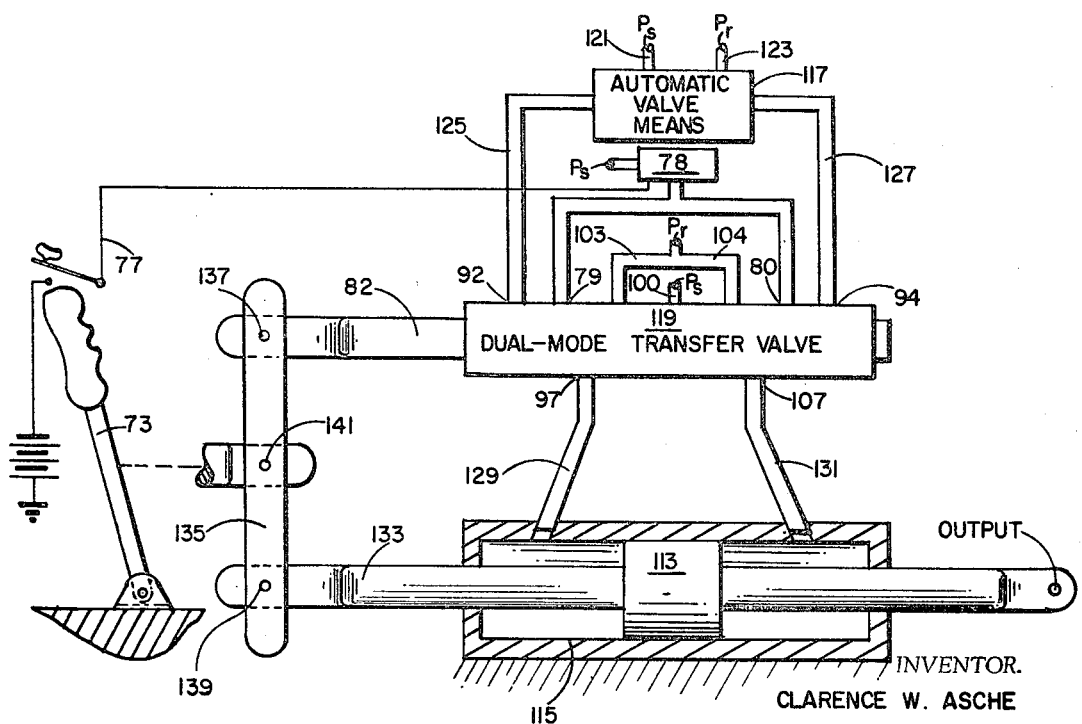
FIGURE 4 is a schematic arrangement of a system employing the device of FIGURE 3.

The dual-mode transfer valve of FIGURE 3 may be utilized in an integrated means for providing fluid communication to an hydraulic load, such as a servoactuator valve, during alternative ones of an automatic and manual fluid control modes, while also providing means for manually metering the fluid flow in such manual mode, as shown particularly in FIGURE 4.

Referring to FIGURE 4, there is shown a schematic arrangement of a system employing the device of FIGURE 3. There is provided a dual-mode transfer valve 119 arranged to cooperate substantially the same as the device of FIGURE 3. There is also provided an electrohydraulic four-way transfer valve 117 for regulating fluid pressure through fluid lines 125 and 127 to a first set of input ports 92 and 94 of transfer valve 119, a control mode switching valve 78 for applying a source of fluid pressure to control mode switching ports 79 and 80 of valve 119, and input ports 100 and $P_r$ for connecting respectively to a source of fluid pressure and a fluid return line. Output ports 97 and 107 are connected to opposite sides of a piston 113 in an hydraulic motor 115 by means of fluid lines 129 and 131. Pressure and return ports 121 and 123, respectively, provide fluid communication between a source of fluid pressure and four-way valve 117.

By means of a three-bar linkage arrangement comprising linkage element 135 in cooperation with a pilot stick 73, four-way valve spool 82 of transfer valve 119, and output element 133 of actuator 115, closed loop servo operation may be provided for the motor 115 in an operating mode of the system of FIGURE 4.

The normal cooperation of the dual-mode transfer valve 119 in the above described arrangement, will be described by making reference to both FIGURES 3 and 4. The system of FIGURE 4 normally operates in the automatic control mode in the absence of any excitation of valve 119 from the monostable state. This monostable state is obtained (in FIGURE 3) by preload means 88 and 90 maintaining an axial bias force upon four-way valve spool 82 from opposite directions. Springs 88, 90 and slidable valve lands 84, 86 cooperate to position four-way valve spool 82 in a centered position. As explained herein above, when slidable valve lands 84 and 86 are positioned as shown in FIGURE 3, fluid paths exist between ports 92 and 97 and ports 94 and 107. Fluid communication is thus provided between the automatic transfer valve 117 and actuator 115, as shown in FIGURE 4. Fluid pressure is selectively ported within valve means 117 into one of fluid paths 125 and 127, and thence through the transfer valve 119 to actuator 115 via ports 92 and 97 and line 129 or via ports 94 and 107 and line 131. At any given instant during automatic mode operation, a selected one of the two fluid communication routes (125, 92, 96, 97, 129 or 127, 94, 98, 107, 131) provides metered fluid pressure to drive the actuator shaft 133, while the other route allows fluid to return to the source. The position of the output end of actuator shaft 133 is therefore automatically controlled in accordance with command signals received by the automatic transfer valve 117 from an automatic flight control system. Because valve spool 82 is contrained in the centered position in such automatic mode, output member 133 in FIGURE 4 will pivot link 135 about point 137, thereby also displacing manual control column 73.

The operation of the system of FIGURE 4 may be changed from such automatic mode to a manual mode by closing stick switch 77, causing hydraulic valve 78 to port fluid pressure to the mode switching ports 79 and 80. Upon the introduction of fluid pressure at ports 79 and 80, slidable lands 84 and 86 are urged to a corresponding axial extremity of spool 82, in opposition to the axial forces exerted by springs 88 and 90, whereby the annular grooves in lands 84 and 86 no longer provide fluid communication between ports 92 and 97 and between ports 94 and 107. Further, such axial displacement of lands 84 and 86 from the shoulders 87 and 89 of spool 82 now allows axial movement of four-way spool 82, with respect to housing 81, for metering fluid between input port 100 and a selected one of output ports 97 and 107. The actuated valve lands 84 and 86 now cooperate to block ports 92 and 94, and fluid lines 96 and 98 respectively. Any change of position of pilot stick 73 now gives rise to a rotation of bar 135 about a pivot 139, shown in FIGURE 4, which displaces valve spool 82, resulting in a corresponding displacement of output member 133, as follows.

Assume for the moment that the direction of the movement of element 73 in FIGURE 4 is toward the right, thereby similarly moving element 82 to the right (bar 135 pivots about point 139). It is apparent from FIGURE 3 that land 111 will no longer block fluid pressure available at input port 100, and fluid line 104 is likewise open due to rightward movement of land 112. Fluid from a pressure source may now communicate through fluid line 106 (in FIGURE 3), output port 97 and path 129 to the left side of piston 113, in FIGURE 4. As output shaft 133 begins to move to the right in response to such applied pressurized fluid, bar 135 pivots counterclockwise about point 141, which is referenced to a position determined by the position of pilot stick 73. With the counterclockwise pivoting of bar 135, valve spool 82 moves to the left until the neutral position thereof within housing 81 is reached. At this point, land 111 again blocks fluid pressure at input port 100, whereby shaft 133 ceases to move to the right. An exactly complementary series of movements would occur in response to a displacement of control stick 73 to the left, should it be desired to displace the actuator output shaft 133 to the left.

The dual-mode transfer valve, described above, makes possible the elimination of an actuator and the combining of multiple functions into one apparatus when compared to the state of the prior art. A few of the significant advantages achieved by utilizing the dual-mode transfer valve are reduction of weight and cost and increased reliability of the overall flight control system of an aircraft.

Although the invention has been described and illustrated in detail it is to be clearly understood that the same is by way of illustration and example only and is not to be taken by way of limitation, the spirit and scope of this invention being limited only by the terms of the appended claims.

I claim:

1. A monostable fluid transfer valve comprising:
   first and second input porting means adapted to be connected to a respective first and second source of fluid,
   output porting means, and
   preloaded hydro-mechanically actuated valve spool means providing for fluid communication between said first input porting means and said output porting means only during an unactuated state of said valve spool means and for metering fluid flow to said output porting means from said second input porting means only during an hydro-mechanically actuated state of said valve spool means.

2. A monostable fluid transfer valve having a preloaded hydro-mechanically actuated valve spool means for connecting an output porting means to alternative ones of first and second input porting means and comprising:
   a pair of preloaded hydraulically actuated slidable valve lands situated within a valve spool housing and having external annular grooves thereon providing fluid communication between said first input porting means and said output porting means only during an unactuated state thereof and allowing fluid communication between said second input porting means and said output porting means only during an actuated state thereof, and
   a mechanically actuated four-way valve spool slidably mounted within said housing cooperating with said slidable valve lands for blocking fluid communication between said second input porting means and said output porting means during said unactuated state of said slidable valve lands and for metering fluid flow to said output porting means from said input porting means only during said hydraulically actuated state of said slidable valve lands.

3. In a mechanically actuated four-way valve adapted to be connected to a source of fluid pressure and having a valve spool enclosed within a housing and further having output parts adapted to cooperate with an hydraulic actuated load, monostable, switching means comprising
   a pair of axially preloaded hydraulically actuated mutually opposed lands each slidably mounted upon said valve spool near an opposite extremity thereof for blocking axial motion of said valve spool relative to said housing during an unactuated state of said lands,
   input porting means in said housing adapted to be connected across a metered source of fluid,
   an annular groove formed on each of said lands providing a fluid path between said metered source of fluid and said output ports of said four-way valve during said unactuated state of said lands, and
   a switchable source of fluid pressure connected to ports in said housing for applying axial force against said lands in opposition to the axial preloaded condition of said lands for overcoming the same thereby allowing mechanical actuation of said valve spool relative to said housing, whereby a fluid path is provided between said source of fluid pressure and said output ports of said four-way valve only during an actuated state of said lands.

4. A monostable, hydraulically-actuated transfer valve comprising
   housing means having a valve chamber therein,
   first and second input ports adapted to be alternatively connected across a first metered source of fluid,
   a third input port adapted to be connected to a second source of fluid,
   first and second output ports adapted to be connected across an hydraulic load,
   preloaded hydraulically actuated slidable valve lands having external annular grooves thereon providing fluid communication between said first input and output ports and between said second input and output ports only during an unactuated state thereof, and
   mechanically actuated four-way valve spool slidably mounted within said valve chamber cooperating with said slidable valve lands for blocking said third input port during said unactuated state of said slidable valve lands and for metering fluid flow to an alternatively selected one of said output ports from said third input port only during an hydraulically actuated state of said slidable valve lands.

5. The device of claim 4 in which there is further provided,
   a pair of switching ports in said housing means adapted to connect a switch controlled source of fluid pressure to said valve chamber for applying an actuating fluid pressure in opposition to a preloaded state of said slidable valve lands only during said hydraulically actuated state of said slidable valve lands.

6. A monstable, hydraulically actuated dual mode transfer valve, comprising
   a valve spool housing having at least a supply pressure input port, pressure return port and two output ports,
   a four-way valve spool having fixed lands thereon slidably mounted within said housing for cooperation with said supply pressure, return pressure and output ports in a first one of two control modes,
   control mode switching means comprising first and second valve lands, each slidably mounted upon opposite axial ends of said valve spool for axial motion therealong,
   a first and second shoulder on said valve spool each being intermediate of either axial extremity of said valve spool for limiting the axial motion of an associated one of said slidable valve lands along said valve spool and toward the center thereof,
   first and second axial preload means fixed to said housing and arranged for urging a respective one of said slidable lands into engagement with a respective one of said intermediately spaced shoulders for restraining said four-way valve spool in a centered position relative to said supply pressure, return pressure and output ports,
   each said preloaded slidable valve lands having an external annular groove thereon for allowing fluid communication between a respective one of said output ports in said housing and one of a pair of controlled fluid ports in said housing when in engagement with said centered four-way valve spool, and
   said housing further having first and second control mode switching ports adapted to be commonly connected to a switched source of supply pressure and located at an intermediate chamber formed by the axial spacing between a respective one of said slidable lands and an associated end one of the fixed lands of said four-way valve spool for opposing said axial preload force upon said slidable land.

7. The combination of claim 6 in which there is further provided
   a four-way control valve having first and second output ports connceted to a respective one of said controlled fluid ports of said housing for providing a source of controlled fluid, a switching valve commonly operatively coupled to said control mode switching ports of said housing and adapted to be connected to a source of supply pressure for selectively axially actuating said slidable valve lands in opposition to preload forces thereon, and an hydraulic motor in fluid circuit with said output ports of said housing and mechanically linked with said four-way valve spool in the manner of an hydraulic servo motor.

8. A fluid transfer valve having a first fluid transfer mode and a second fluid metering mode of operation comprising a valve spool, and monostable means cooperating with said valve spool for providing fluid transfer between a source of fluid pressure and a fluid actuated load only during a stable state thereof, said valve spool providing mechanical metering of a fluid pressure source only during an astable state of said monostable means.

9. The apparatus of claim 8 drivingly cooperating with hydraulic actuator means having an actuator shaft with one external end thereof adapted to be mechanically linked to a control stick and providing a controlled displacement output at an opposite external end.

10. The device of claim 8 in which there is further provided mode control means for switching the operation of said fluid transfer valve between said stable and astable states.

11. A monostable, dual-mode fluid actuator system comprising housing means having a valve chamber therein, first and second input ports adapted to be alternatively connected across a first metered source of fluid, a third input port adapted to be connected to a second source of fluid, first and second output ports, preloaded hydraulically actuated slidable valve lands having external annular grooves thereon providing fluid communication between said first output and input ports and between said second output and input ports only during an unactuated state thereof, a pair of control mode switching ports in said housing means adapted to connect a switch controlled source of fluid pressure to said valve chamber for applying an actuating fluid pressure in opposition to a preloaded state of said slidable valve lands only during said hydraulically actuated state of said slidable valve lands, mechanically actuated four-way valve spool means slidably mounted within said valve chamber cooperating with said slidable valve lands for blocking said third input port during said unactuated state of said slidable valve lands and for metering fluid flow to an alternatively selected one of said output ports from said third input port only during an hydraulically actuated state of said slidable valve lands, an hydraulic motor in fluid circuit with said first and second output ports having an actuator shaft with one external end thereof adapted to be mechanically linked to a control stick and providing a controlled displacement output at an opposite external end, and three bar linkage means for mutually mechanically coupling an external portion of said valve spool means, said control stick and said actuator shaft for providing mechanical metering of fluid flow by said valve spool means.

12. The combination of claim 11 in which there are further provided a four-way control valve having first and second output ports connected respectively to said first and second input ports of said housing means for providing a metered source of fluid, and a switching valve commonly operatively coupled to said pair of control mode switching ports of said housing means and adapted to be connected to a source of supply pressure for selectively axially actuating said slidable valve lands in opposition to preload forces thereon.

References Cited
UNITED STATES PATENTS

| | | | |
|---|---|---|---|
| 2,738,772 | 3/1956 | Richter | 91—33 |
| 2,877,968 | 3/1959 | Granan | 91—32 |
| 3,122,972 | 3/1964 | Rasmussen | 91—384 |
| 3,253,613 | 5/1966 | Richolt | 137—625.48 |
| 3,274,902 | 9/1966 | Kleckner | 91—420 |
| 3,324,887 | 6/1967 | Mueller | 137—625.63 |

EDGAR W. GEOGHEGAN, *Primary Examiner.*

MARTIN P. SCHWADRON, *Examiner.*

B. L. ADAMS, *Assistant Examiner.*